Figure 1:
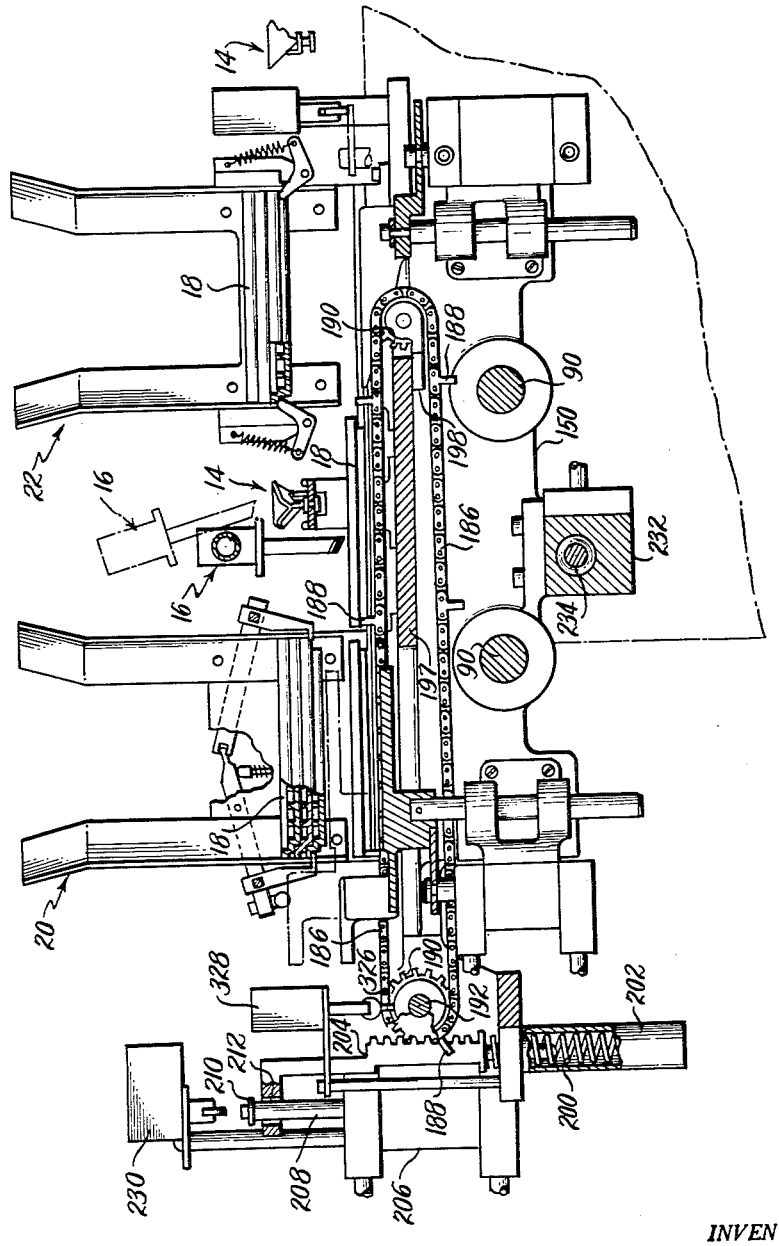

June 14, 1960 S. J. GARTNER 2,940,327
TRAYING DEVICE
Original Filed April 15, 1954 2 Sheets-Sheet 1

INVENTOR.
Stanley J. Gartner
BY
Michael Hertz,
ATTORNEY

June 14, 1960     S. J. GARTNER     2,940,327
TRAYING DEVICE
Original Filed April 15, 1954     2 Sheets-Sheet 2
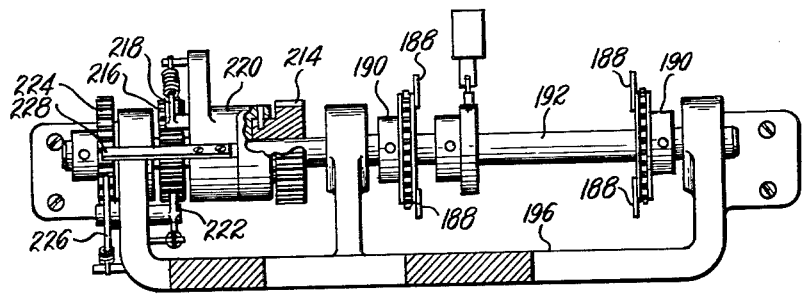
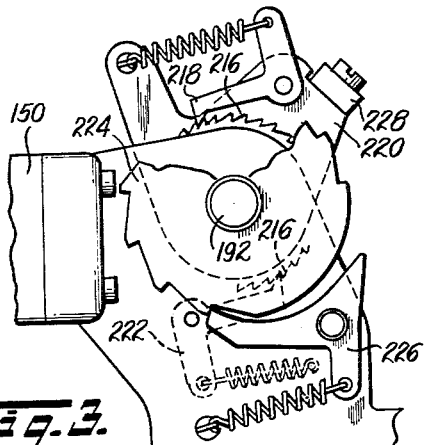
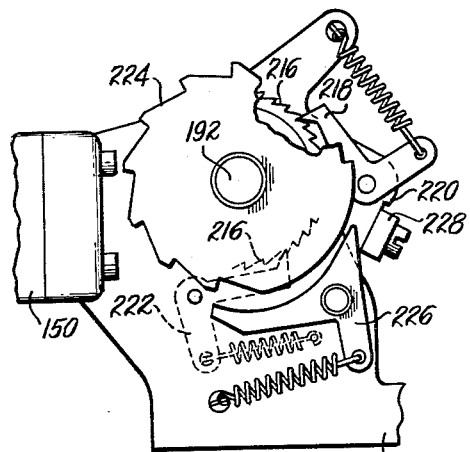
INVENTOR.
Stanley J. Gartner
BY
ATTORNEY

United States Patent Office 2,940,327
Patented June 14, 1960

2,940,327
TRAYING DEVICE

Stanley Jacob Gartner, Emporium, Pa., assignor, by mesne assignments, to Sylvania Electric Products Inc., Wilmington, Del., a corporation of Delaware Original application Apr. 15, 1954, Ser. No. 423,391, now Patent No. 2,821,825, dated Feb. 4, 1958. Divided and this application Feb. 15, 1957, Ser. No. 640,444

4 Claims. (Cl. 74—130)

This invention relates to handling devices wherein articles are transferred one by one from a series of buckets mounted on a conveyer to pockets in a tray and wherein the tray is shifted from underneath a supply stack to a number of filling positions and then to a position beneath a second stack for elevation upward to a position from which the tray may be removed. Each of the pockets may have deposited therein one or a selected larger number of articles.

Specifically the invention relates to a grid traying device wherein grids are transferred from a grid making machine to pockets in trays.

It is an object of the invention to provide in such a machine novel means for advancing the grid tray for loading pockets therein. Other objects will be apparent after reading the following description and claims.

The invention will be understood after consideration of the following specification in conjunction with the accompanying drawings in which Fig. 1 is a vertical sectional view showing means for advancing a tray along a tray carriage from a tray storage stack to a tray receiving stack.

Fig. 2 is an elevational view, partly in section, of a portion of the tray advancing means.

Figs. 3, 4, and 5 are views showing different positions of operating mechanism utilized for advancing the trays.

This application is a division of application Serial #423,391 filed April 15, 1954 and patented on February 4, 1958 as Patent Number 2,821,825. Reference may be made to this patent for further description of parts which may be shown herein and not fully described, but which parts are shown to provide a proper setting for the invention.

In general, and in so far as the invention herein claimed is concerned, the machine comprises a carriage 150 rigidly carrying a plate 197, the carriage being reciprocatable along a pair of bars 90. About the plate 197 there is trained chain mechanism 186, as will be described in detail, upon which are deposited compartmented trays 18 from a supply chute 20 fixed on the carriage, the trays one by one having their compartments filled by deposit of grids therein by a nozzle 16 which moves between a position where it dips down to pick up a grid from a bucket 14 to a fixed position shown in full lines in Fig. 1 to release a picked up grid to allow it to deposit in a compartment in the tray, and which then moves back again to pick up another grid, and by movement of the tray in a serpentine path by stepping movement of the carriage and by intermittent movement of the chains. After all the compartments in a tray have been filled, the tray is elevated into a stacking chute 22 also fixed on the carriage.

The trays 18 are indexed from front to rear of the machine (to the right in Fig. 1) by the chain mechanism comprising a pair of spaced apart parallel chains 186, each having lugs 188 in opposition to one another on the chains and equally spaced therealong, the lugs of the chains being operative to engage the forward end of a tray and propel the tray to the rear of the machine upon indexing movement of the chains. The chains are trained around sprockets 190 mounted on shafts 192 and 194 at the front and rear of the carriage 150, the front sprockets being pinned to the shaft 192 mounted on the carriage and the rear sprockets being loose on the shaft 194. The shaft 192 is mounted in a bearing frame 196 secured to the front of the carriage while the shaft 194 is mounted on carriage plate 197 by brackets 198. The trays themselves are partitioned longitudinally and transversely to form pockets, rectangular in plan.

A tray is indexed rearwardly of the machine a distance in accordance with the spacing between the transverse centers of the pockets and the carriage is indexed longitudinally of the machine, that is, in directions perpendicular to the plane of the paper in Fig. 1, distances dependent on the longitudinal spacing of the pockets in the tray. In addition the machine provides for a longer transverse indexing movement of the tray rearwardly of the machine on exchange of trays under the grid transfer nozzle.

To effect the transverse indexing movement of the trays, there is provided a compression spring 200 reacting at its lower end against the bottom of a cage 202 fastened to the carriage and reacting at its upper end against the bottom of rack bar 204. The rack bar is restrained against upward movement by fluid pressure mechanism comprising a cylinder 206, a piston 208 and a washer 210 on the piston, the piston passing freely through an opening 212 in a right angular portion of the rack bar with the washer normally engaging the upper surface of the angular portion thus restraining upward movement of the rack bar. On fluid pressure being released from above the piston and fluid being admitted beneath the piston, the rack bar will be permitted to rise until otherwise restrained, as will be explained, but the piston may continue to move upward. On fluid pressure being applied above the piston, the washer 210 will move down into engagement with the rack bar and will depress the bar against the action of spring 200.

The rack bar is engaged with a pinion 214 freely rotatable on shaft 192. Also mounted on the shaft but pinned thereto is a ratchet wheel 216. This ratchet wheel is driven by a pawl 218 pivotally mounted on an arm of a sleeve 220 freely rotatable about the shaft but pinned to the rack bar driven pinion 214. Upward movement of the rack bar will therefore move the pawl to rotate the ratchet wheel and the shaft 192 while downward movement of the rack bar will merely result in the ratcheting of the pawl 216 over the teeth of the ratchet wheel. A spring pressed arresting pawl 222 is provided to prevent undesired backward rotation of the ratchet wheel. Also pinned on the shaft is a rotation limiting means in the form of a stepped detent wheel 224 having a number of short steps proportional to the transverse spacing between pockets of a tray and a single long step proportional to the distance a tray should be moved from the last transverse pocket of one tray to the first transverse pocket of the next tray. Cooperating with this detent wheel is the spring urged stop pawl 226 to limit the rotation of the shaft to the angular distances provided by the steps on the wheel 224. When the rack bar is down an arm 228 fast on the sleeve 220 has released the stop pawl 226; initial movement of the rack bar upward releases the stop pawl to the action of its spring. But in the meantime the detent wheel 224 has moved through a sufficient angular distance to allow the pawl 226 to come to rest on the next step. Rotating of the detent wheel and therefore ratchet wheel 216, sleeve 220 and pinion 214 therefore continues until the toe of pawl 226 engages the next tooth. Thus the pinion 214 drives the rack 204 up a limited extent. While the rack bar is limited in upward displacement by the detent wheel 224, the piston 208 can continue to move upward until its upper end engages the plunger of a switch 230 serving to reverse the valves controlling the cylinder 206 to effect downward displacement of the piston 208 and the rack bar, the pawl 218 at this time ratcheting idly back over the teeth of the ratchet wheel 216. The movement of the rack in one direction has rotated the shaft 192 through an angular distance determined by the length of the steps on the detent wheel 224 and thus has driven the sprockets 190 a given angular distance. Thereby the lugs 188 on the chains driven by the sprockets have advanced a fixed required distance, advancing the grid trays a distance equal to the spacing of the pockets therein or the spacing between the last row of pockets in one tray and the first row of the next tray.

Having thus described my invention what is claimed is:

1. Tray advancng means comprising a conveyor driven from a shaft, a driven pinion loose on said shaft, a pawl movable with said pinion, a ratchet, engaged by said pawl, fast on said shaft, mechanism including a rack for driving said pinion, resilient means urging said rack in one direction, hold back means for restraining said rack from movement in said one direction, there being a lost motion connection between the hold back means and the rack, motor means for moving the hold back means in a direction to relieve it of its restraining action, a motion limiting means to limit the rack displacement under influence of the resilient means while the hold back means continues to move, and means to reverse the motor means and the hold back means at the end of the path of movement of the hold back means to cause said hold back means to restore the rack to initial position against the force of the resilient means.

2. Tray advancing means comprising a conveyor driven from a shaft, a driven pinion loose on said shaft, a pawl movable with said pinion, a ratchet, engaged by said pawl, fast on said shaft, mechanism including a rack for driving said pinion, resilient means urging said rack in one direction, hold back means for restraining said rack from movement in said one direction, there being a lost motion connection between the hold back means and the rack, motor means for moving the hold back means in a direction to relieve it of its restraining action, a motion limiting means to limit the rack displacement under influence of the resilient means while the hold back means continues to move, and means to reverse the motor means and the hold back means at the end of the path of movement of the hold back means to cause said hold back means to restore the rack to initial position against the force of the resilient means, said motion limiting means comprising a stepped wheel fast on said shaft with steps of different size and a pawl engageable with the steps to variably limit rotation of the stepped wheel and shaft.

3. Tray advancing means comprising a conveyor driven from a shaft, a driven pinion loose on said shaft, a sleeve on the shaft fixed to the pinion, a pawl mounted on said sleeve, a ratchet engaged by said pawl, fast on said shaft, mechanism including a rack for driving said pinion, resilient means urging said rack in one direction, hold back means for restraining said rack from movement in said one direction, there being a lost motion connection between the hold back means and the rack, motor means for moving the hold back means in a direction to relieve it of its restraining action, a motion limiting means to limit the rack displacement under influence of the resilient means while the hold back means continues to move, and means to reverse the motor means and the hold back means at the end of the path of movement of the hold back means to cause said hold back means to restore the rack to initial position against the force of the resilient means.

4. Tray advancing means comprising a conveyor driven from a shaft, a driven pinion loose on said shaft, a sleeve on the shaft fixed to the pinion, a pawl mounted on said sleeve, a ratchet engaged by said pawl, fast on said shaft, mechanism including a rack for driving said pinion, resilient means urging said rack in one direction, hold back means for restraining said rack from movement in said one direction, there being a lost motion connection between the hold back means and the rack, motor means for moving the hold back means in a direction to relieve it of its restraining action, a motion limiting means to limit the rack displacement under influence of the resilient means while the hold back means continues to move, and means to reverse the motor means and the hold back means at the end of the path of movement of the hold back means to cause said hold back means to restore the rack to initial position against the force of the resilient means, said motion limiting means comprising a stepped wheel fast on said shaft with steps of different size and a pawl engageable with the steps to variably limit rotation of the stepped wheel and shaft.

References Cited in the file of this patent

UNITED STATES PATENTS

| | | |
|---|---|---|
| 638,325 | Ellsworth | Dec. 5, 1899 |
| 1,939,383 | Bradley et al. | Dec. 12, 1933 |
| 1,946,452 | Bridges | Feb. 6, 1934 |
| 2,072,502 | Haub | Mar. 2, 1937 |
| 2,103,901 | Gordon | Dec. 28, 1937 |
| 2,609,111 | Daves et al. | Sept. 2, 1952 |
| 2,687,813 | Verrinder | Aug. 31, 1954 |
| 2,692,691 | Harriss et al. | Oct. 26, 1954 |
| 2,797,795 | West | July 2, 1957 |